Nov. 24, 1925.
G. D. HARRIS
ART OF DRYING SEMILIQUID MATERIALS
Filed Oct. 23, 1920
1,562,761
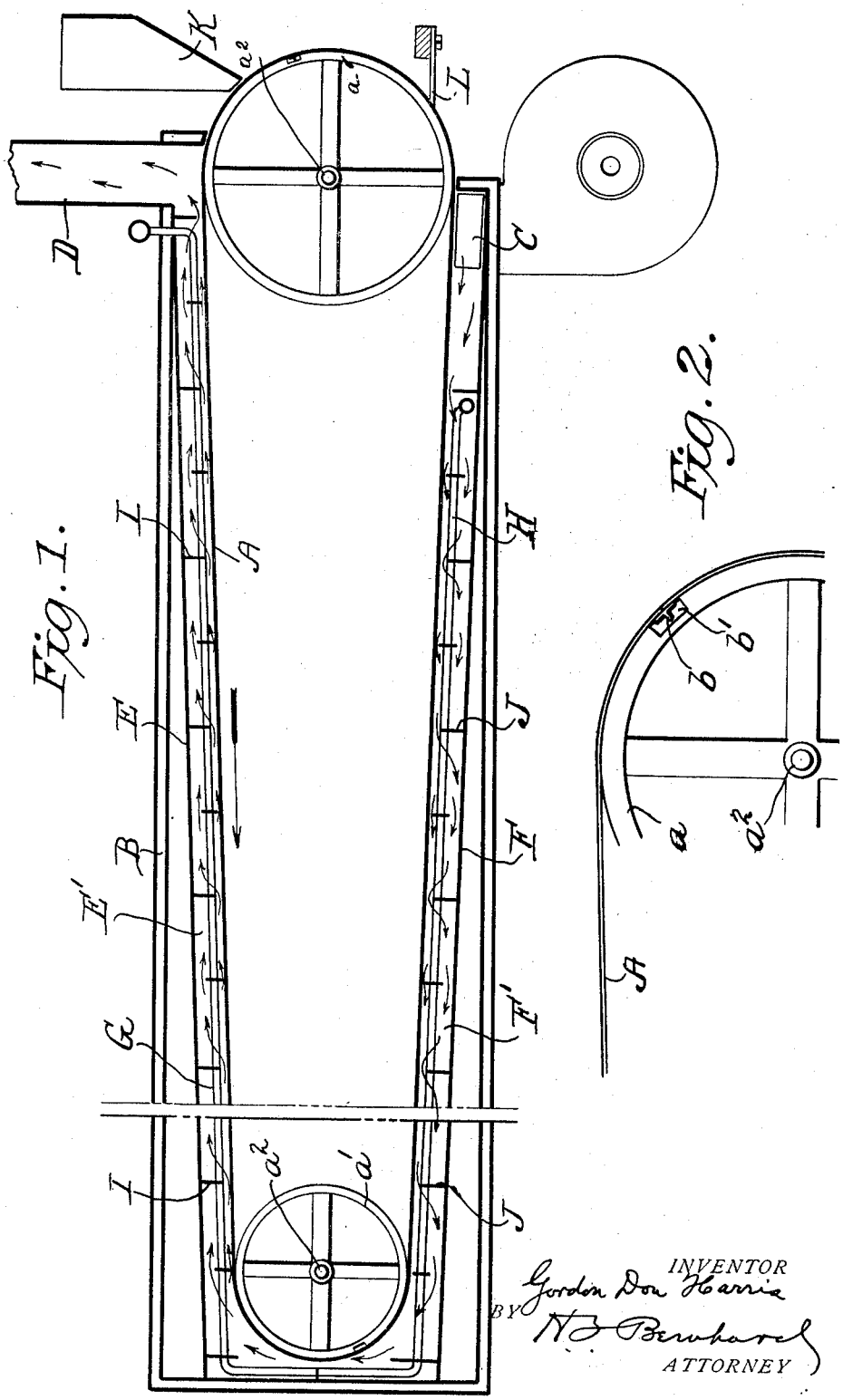
INVENTOR
Gordon Don Harris
BY
ATTORNEY Patented Nov. 24, 1925.

1,562,761

UNITED STATES PATENT OFFICE.

GORDON DON HARRIS, OF ISLIP, NEW YORK, ASSIGNOR, BY MESNE ASSIGNMENTS, TO THE INDUSTRIAL DRYER CORPORATION, OF STAMFORD, CONNECTICUT, A CORPORATION OF CONNECTICUT.

ART OF DRYING SEMILIQUID MATERIALS.

Application filed October 23, 1920. Serial No. 419,054.

*To all whom it may concern:*

Be it known that I, GORDON DON HARRIS, a citizen of the United States, residing at Islip, county of Suffolk, and State of New York, have invented a certain new and useful Art of Drying Semiliquid Materials, of which the following is a specification.

This invention pertains to the art of drying semi-liquid materials, such as milk, eggs, blood and food products, although it is to be understood that the invention may be used for drying materials other than those specified.

In the art of treating food substances, such as milk, it is desirable to evaporate the moisture content so as ultimately to attain a product in a pulverulent and dry condition, such evaporation being effected while maintaining the semi-liquid material in a heated condition, the temperature of said material being constant, or substantially constant, throughout the treatment except at the period just prior to delivery, at which period the dry product is cooled, more or less.

According to this invention, the semi-liquid material is spread or diffused in the form of a film upon the surface of a mechanically propelled carrier, and while in such condition and in motion, the film of material is heated to the required temperature and exposed to the action of a drying atmosphere circulated into contact with said film for evaporating the moisture content thereof.

In the form of apparatus adapted for carrying out the invention, the mechanically propelled carrier is an endless apron supported by suitable means within a chamber, the latter having an inlet for the drying atmosphere and an exit for said atmosphere laden more or less with moisture evaporated from the semi-liquid material on said carrier apron. Cooperating with said carrier apron are baffles which produce flow channels of relatively narrow cross sectional area, and within such flow channels are positioned heaters that are in the line of flow of the drying atmosphere, the latter circulating freely into contact with the film of material upon the surface of the carrier apron.

The flow of the drying atmosphere is in a direction contrary to the direction of movement of the film upon the surface of the endless carrier, said atmosphere being supplied to the chamber at the temperature of the outside air; as a result of which the air admitted initially to the chamber has a tendency to cool, or partially cool, the dried material upon the endless carrier at or adjacent the delivery end thereof, and the drying atmosphere circulated into contact with the heated material becomes partially heated by such contact, the air flowing within the flow channels so as to be heated to the desired temperature by heating coils within said flow channels.

The apparatus is automatic in operation, requiring no attendance of labor, for the reason that the feed of the material and its distribution in a film upon the conveyor apron are effected mechanically, whereas the speed, volume and velocity of the drying atmosphere are dependent upon the operation of a blower, and the temperature control is obtained by suitable mechanism, thereby resulting in an apparatus adapted for the production of a dry powder on a commercial scale, which apparatus is economical in construction and operation, and the product is handled wholly by mechanical appliances and under hygienic conditions free from contact with human hands.

Other functions and advantages of the invention will appear from the following description taken in connection with the drawings, wherein—

Figure 1 is a vertical longitudinal section, and

Figure 2 is an enlarged detail view of one of the drums for the endless carrier.

A designates the movable carrier, herein shown as an endless apron composed of suitable material, such as wire gauze of small mesh, fabric, or other material suitable for the purpose. Said apron is positioned within a housing or casing B, the same being provided with an inlet C for the drying atmosphere and with a stack or flue D for the outlet of the atmosphere, laden more or less with moisture evaporated from the material. The drying atmosphere, usually air, is circulated within the housing by the action of a blower C', the outlet of which is in communication with the intake C of the casing, see Figure 1. The apron is supported on barrels, drums or sprocket wheels *a*, *a'*, one of smaller diameter than the other, the larger barrel $a$ being power driven for imparting movement to the carrier apron, whereas the smaller barrel $a'$ is adapted for movement by suitable adjusting devices, not shown herein, but used in the art, for taking up slack in the carrier apron, said barrels being carried by shafts $a^2$ suitably mounted in the casing or housing.

It is desirable in some instances to provide the endless apron with one or more slats $b$ on the inner surface, said slat or slats acting as a stay or stop, see Figure 2, in which case one of the shafts $a^2$ is provided with sprockets the rims of which has a pocket or pockets $b'$ within which the slat or slats $b$ are adapted to work.

E F are baffles positioned within the casing or housing and in cooperative relation to the upper and lower leads of the endless apron, said baffles extending longitudinally of the casing and being inclined therein at angles corresponding to the angles of inclination of the upper and lower leads of said apron. The baffles are thus positioned parallel to the leads of the apron, and produce therewith flow channels $E'$ $F'$ next to said apron, and within said channels is adapted to circulate the drying atmosphere, the velocity, volume and capacity of which is determined by the action of a fan or blower (not shown), whereby the drying atmosphere flows into contact with the material on the outer surfaces of the apron.

Positioned within said flow channels $E'$ $F'$ are heaters G H, herein shown as coils for the circulation of steam, air, water or other heating medium, although it may be desirable to utilize electric heaters. The heating coils are of desired radiating capacity, and they are shown as extending longitudinally within the flow channels, said coils being co-extensive with the leads of the apron and parallel therewith.

For securing a desired flow of the drying atmosphere into intimate contact with the material on the conveyer apron, and into contact also with the heaters, I provide the transverse baffles I J, the latter being positioned crosswise within the flow channels and transversely to the heating coils, said transverse baffles being positioned in staggered or alternate relation for the purpose of diverting the flow of the drying atmosphere so as to direct it toward the material on the apron and the heating pipes, whereby the drying atmosphere is heated to a temperature desired for exchanging heat for moisture.

Suitable means are provided for feeding the semi-liquid material to the carrier apron, the same being shown as a hopper or trough K positioned close to the surface of the apron at the end where said apron is exposed outside of the housing B, see Figure 1.

Means are provided for effecting the detachment of the dried material from the apron, said means being shown as a knife or scraper L positioned in close relation to the path of the apron at the point where said apron is fitted to the barrel or sprockets $a$, see Figure 1.

In operation, the barrel or sprockets $a$ are rotated for imparting motion to the apron, steam is admitted to the heaters, the blower feeds air at atmospheric temperature to the flow channel $F'$, and the liquid material is deposited in a relatively thin film on the surface of the apron. The apron carries the material within the flow channels, whereas the air is circulated in an opposite direction to the direction of movement of the film. The air flowing within the flow channels is heated by the coils and directed by the transverse baffles into contact with the material, effecting the exchange of heat for moisture so as to evaporate the aqueous content of the material. The drying atmosphere laden with moisture more or less flows out of the exit D, but the inflowing air admitted at the inlet flows into contact with the warm material adjacent the delivery end of the apron, thus measurably reducing the temperature of the dry material and imparting some heat to the air as it begins its circulation within the flow channel $F'$. The air circulates into intimate contact with the heating coils and with the film of material, so that the coils heat the air to the required temperature, and as the material is exposed as a thin film and for the considerable area afforded by the endless apron the product is dried as it moves in the long path provided by the flow channels $E'$ $F'$, the dried product being detached from the apron by the scraper.

Having thus fully described the invention, what I claim as new and desire to secure by Letters Patent is:

1. In an apparatus for treating liquid and semiliquid materials, a chamber, an endless carrier movable within said chamber, an end portion of said carrier being exposed to access exteriorly of said chamber, means for feeding to the exposed part of the carrier material in a film-like condition, baffles within the chamber and adjacent the carrier for producing a succession of flow channels, heating means positioned substantially centrally within the flow channels, transverse baffles also within the flow channels, said transverse baffles being staggered relatively to the carrier and the first named baffles, said two series of baffles being disposed alternately adjacent upper and lower boundaries of the flow channels, an outlet from the chamber at one end of the flow channels, said outlet for the drying atmosphere being adjacent the point at which the material is fed to the exposed part of said carrier, means for feeding atmospheric air at normal temperature to the flow channel adjacent the point of egress of material from said chamber, whereby the inflowing cool air is conducted into contact with the heated product upon said carrier for reducing the temperature of said product, and means for circulating air within the flow channels in a direction contrary to the direction of movement of said material.

2. An apparatus for treating liquid materials and semi-liquid materials embodying a housing, a carrier movable therein, said carrier being in opposing relation to the walls of the housing and forming therewith a succession of flow channels, heating means positioned substantially centrally within the flow channels, transverse baffles disposed alternately adjacent upper and lower boundaries of the flow channels, means for feeding the material to said carrier, and means for circulating a drying atmosphere within the flow channels.

3. An apparatus for treating liquid materials and semi-liquid materials embodying a housing, and endless carrier the leads or runs of which are positioned in opposing relation to the walls of said housing and forming therewith a succession of flow channels, transverse baffles disposed alternately adjacent upper and lower boundaries of the flow channels, heating means positioned substantially centrally within said flow channels and crossing the planes of the baffles, and means for circulating a drying atmosphere within the flow channels and into contact with said baffles and with the leads or runs of said carrier.

4. In the art of concentrating liquid or semi-liquid materials, the process which consists in moving a film of material within a circulatory path having an inlet and an outlet for such material, feeding to the circulatory path a drying current of atmospheric air, circulating such drying current of atmospheric air within the circulatory path and in a direction contrary to the movement of the film of material and into contact therewith, repeatedly heating the drying current of atmospheric air as it flows within said circulatory path to maintain such drying current at a temperature less than the temperature of the film of material, and diverting the course of the drying current within the circulatory path to direct such current into repeated alternate contacts with the moving film of material and with heating surfaces.

In testimony whereof I have signed my name hereto this 11th day of October, 1920.

GORDON DON HARRIS.